United States Patent
Li et al.

(10) Patent No.: US 8,925,699 B2
(45) Date of Patent: *Jan. 6, 2015

(54) POWERTRAIN PRESSURE AND FLOW CONTROL SYSTEM FOR AUTOMATIC TRANSMISSIONS

(75) Inventors: Dongxu Li, Warren, MI (US); Farzad Samie, Franklin, MI (US); Chunhao J. Lee, Troy, MI (US); Kumaraswamy V. Hebbale, Troy, MI (US); Chi-Kuan Kao, Troy, MI (US); Andrew L. Bartos, Clarkston, MI (US); Kevin B. Rober, Washington, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 763 days.

This patent is subject to a terminal disclaimer.

(21) Appl. No.: 13/195,303

(22) Filed: Aug. 1, 2011

(65) Prior Publication Data

US 2012/0090703 A1  Apr. 19, 2012

Related U.S. Application Data

(60) Provisional application No. 61/393,384, filed on Oct. 15, 2010.

(51) Int. Cl.
*F16H 45/02* (2006.01)
*F16D 25/12* (2006.01)
*F16H 61/02* (2006.01)
*F16K 99/00* (2006.01)

(52) U.S. Cl.
CPC ........ *F16H 61/0251* (2013.01); *F16K 99/0007* (2013.01); *F16K 99/0036* (2013.01); *F16K 99/0044* (2013.01)
USPC ...................................... 192/3.29; 192/85.63

(58) Field of Classification Search
CPC . F16H 2045/0294; B60K 17/02; F16D 11/08; F16D 11/10; F16D 13/70; F16D 23/12; F16D 43/28; F16D 48/06
USPC ......................... 192/3.29, 3.58, 43.1; 475/127
See application file for complete search history.

(56) References Cited

U.S. PATENT DOCUMENTS

| 6,494,804 | B1 | 12/2002 | Hunnicutt et al. |
| 6,540,203 | B1 | 4/2003 | Hunnicutt |
| 6,755,761 | B2 | 6/2004 | Hunnicutt et al. |
| 2003/0092526 | A1 | 5/2003 | Hunnicutt et al. |
| 2004/0007405 | A1 | 1/2004 | Noda et al. |
| 2004/0220015 | A1 | 11/2004 | Murakami et al. |

*Primary Examiner* — Richard M. Lorence
*Assistant Examiner* — Stacey Fluhart
(74) *Attorney, Agent, or Firm* — Quinn Law Group, PLLC (57) ABSTRACT

A pressure and flow control system includes a hydraulically-controlled component, a pilot valve, and a regulating valve. The pilot valve is configured to produce a pilot signal and includes a first valve, which is a MEMS microvalve. The regulating valve is in fluid communication with the pilot valve, and is configured to receive the pilot signal. The regulating valve is further configured to output a control signal, which controls the hydraulically-controlled component.

8 Claims, 4 Drawing Sheets

POWERTRAIN PRESSURE AND FLOW CONTROL SYSTEM FOR AUTOMATIC TRANSMISSIONS

CROSS-REFERENCE TO RELATED APPLICATIONS

This application claims the benefit of U.S. Provisional Patent Application Ser. No. 61/393,384, filed on Oct. 15, 2010, which is hereby incorporated by reference in its entirety.

TECHNICAL FIELD

This disclosure relates to hydraulic control of powertrains, transmissions, and the hydraulically-controlled components thereof.

BACKGROUND

Vehicle powertrains may include transmissions to transfer power and torque from an engine to the vehicle output (axles or wheels). Hybrid powertrains may include multiple primary movers, including internal combustion engines or alternative power sources, such as one or more electric machines coupled with an energy storage device. When the powertrain is equipped with an additional primary mover, such as an electric machine, the transmission may also transfer torque and power from the electric machine to provide traction for the vehicle. Fixed-gears or speed ratios allow the engine to operate within a narrow range of speeds while providing a wide range of output speeds to the powertrain.

Different gears or operating modes of the transmission provide different, selectable speed ratios or gear ratios, and also different levels of torque multiplication. Changing the speed ratio of the transmission generally changes the ratio of input speed to the output speed and changes the torque multiplication between the input and the output. Selection of speed ratios may occur through actuation of hydraulic components controlled by one or more hydraulic valves. The hydraulic pressure and flow regulated or provided by these valves selects the requested speed ratio.

SUMMARY

A pressure and flow control system is provided. The pressure and flow control system may be used within a powertrain and includes a hydraulically-controlled component and a pilot valve. The pilot valve includes a first valve, and is configured to produce a pilot signal. The first valve is a Micro Electro Mechanical Systems (MEMS) microvalve. A regulating valve is in fluid communication with the pilot valve. The regulating valve is configured to receive the pilot signal from the pilot valve and is configured to output a control signal which controls the hydraulically-controlled component.

The regulating valve may be a MEMS-based spool valve or may be a small mechanical spool valve. Furthermore, the pilot valve may further include a second valve, and the regulating valve may be a conventional mechanical regulating valve. The second valve may be a MEMS-based spool valve or may be a small mechanical spool valve. The hydraulically-controlled component may be a clutch assembly, a lubrication loop, on/off states for gear selection, line pressure, or a torque converter clutch.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
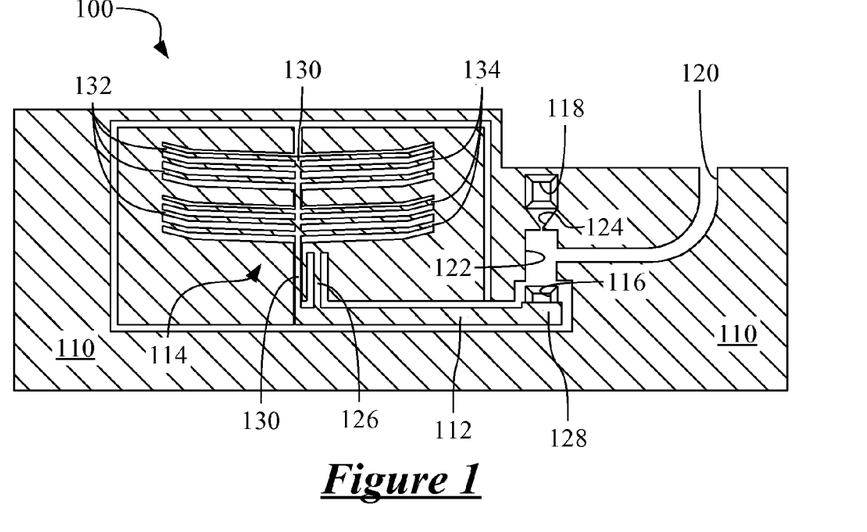
FIG. 1 is a schematic cross-sectional view of a Micro Electro Mechanical Systems (MEMS) microvalve actuator.

Referring to the drawings, wherein like reference numbers correspond to like or similar components throughout the several figures, there is shown in FIG. 1 schematic cross-sectional view of a Micro Electro Mechanical Systems (MEMS) microvalve actuator 100. As discussed herein, the MEMS microvalve 100 may be used to effect hydraulic control—by controlling pressure or flow of a fluid—over one or more hydraulic components, such as those within a transmission. The MEMS microvalve 100 shown is only one type of MEMS device that may be used as a control valve or control actuator for the hydraulic components, and others, discussed herein. The MEMS microvalve 100 may also be referred to as a pressure differential actuator or a pilot direct actuating valve (PDA).

While the present invention may be described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Generally, MEMS may be considered a class of systems that are physically small, having features with sizes in the micrometer range. MEMS systems may have both electrical and mechanical components. MEMS devices are produced through micromachining processes. The term "micromachining" generally refers to the production of three-dimensional structures and moving parts through processes including modified integrated circuit (computer chip) fabrication techniques (such as chemical etching) and materials (such as silicon semiconductor material). The term "microvalve" as used herein generally refers to a valve having features with sizes in the micrometer range, and thus by definition is at least partially formed by micromachining. The term "microvalve device" as used in this application means a device that includes a microvalve, and that may include other components. MEMS devices may be operating in conjunction with other MEMS (micromachined) devices or components or may be used with standard sized (larger) components, such as those produced by mechanical machining processes.

Referring to FIG. 1, the MEMS microvalve 100 includes a housing or body 110. The MEMS microvalve 100 may be formed from several layers of material, such as semi-conductor wafers. The body 110 may also be formed from multiple layers. For example, and without limitation, the cross-sectioned portions shown may be taken through a middle layer of the MEMS microvalve 100, with two other layers existing behind and in front of (relative to the view in FIG. 1) the middle layer. The other layers of the body 110 may include solid covers, port plates, or electrical control plates. However, each of the layers is generally considered part of the body 110, except where separately identified.

The MEMS microvalve 100 includes a beam 112 actuated by a valve actuator 114. Selective control of the actuator 114 causes the beam 112 to alter the flow of fluid between an inlet port 116 and an outlet port 118. By varying the fluid flow between the inlet port 116 and the outlet port 118, the MEMS microvalve 100 varies the pressure in a pilot port 120. As described herein, the pilot port 120 may be connected to additional valves or devices in order to effect hydraulic control thereof through a pilot signal, which varies based upon the pressure and flow communicated through the pilot port 120.

The inlet port 116 is connected to a source of high-pressure fluid such as a pump (not shown). The outlet port 118 is connected to a low-pressure reservoir, sump, or fluid return (not shown). For purposes of the description herein, the outlet port 118 may be considered to be at ambient pressure, and acts as a ground or zero state in the MEMS microvalve 100.

The beam 112 moves in a continuously variable manner between a first position, illustrated in FIG. 1, a second position (not shown), and myriad intermediate positions. In the first position, the beam 112 does not completely block the inlet port 116. However, in the second position, the beam 112 blocks the inlet port 116 to prevent substantially all flow from the high-pressure fluid source.

A first chamber 122 is in fluid communication with both the inlet port 116 and the outlet port 118. However, communication between the outlet port 118 and the first chamber 122 (and also the inlet port 116) is restricted by an outlet orifice 124. High pressure or fast fluid flow through the outlet orifice 124 causes a pressure differential to build between the first chamber 122 and the outlet port 118.

The beam 112 is pivotally mounted to a fixed portion of the body 110 by a flexure pivot 126. The opposite portion of the beam 112 from the flexure pivot 126 is a movable end 128, which moves up and down (as viewed in FIG. 1) to selectively and variably cover and uncover the inlet port 116.

When the beam 112 is in the second position, it allows little or no flow from the inlet port 116 to the first chamber 122. Any pressurized fluid in the first chamber 122 bleeds off through the outlet orifice 124 to the outlet port 118. As the beam 112 of the MEMS microvalve 100 is moved toward the first (open) position, the inlet port 116 is progressively uncovered, allowing faster flows of fluid from the inlet port 116 into the first chamber 122. The fast-flowing fluid cannot all be drained through the outlet orifice 124 and causes a pressure differential to form as the fluid flows through the outlet orifice 124, raising pressure in the first chamber 122.

As the inlet port 116 is further opened to the first position (as shown in FIG. 1), fluid gradually flows faster through the outlet orifice 124, causing a larger pressure differential and further raising the pressure in the first chamber 122. When the beam 112 is in the first position, it allows high flow from the inlet port 116 to the first chamber 122. Therefore, the pressure in the first chamber 122 can be controlled by controlling the rate of flow from the inlet port 116 through the first chamber 122 and the outlet orifice 124 to the outlet port 118. The position of the beam 112 controls the rate of flow of the fluid from the inlet port 116, and thus the pressure in the first chamber 122.

The valve actuator 114 selectively positions the beam 112. The actuator 114 includes an elongated spine 130 attached to the beam 112. The actuator 114 further includes a plurality of first ribs 132 and a plurality of second ribs 134, which are generally located on opposing sides of the elongated spine 130. Each of the first ribs 134 has a first end attached to a first side of the elongated spine 130 and a second end attached to the body 110. Similar to the first ribs 132, each of the second ribs 134 has a first end attached to the elongated spine 130 and a second end attached to the fixed portion of the body 110.

The elongated spine 130, the first ribs 132, and the second ribs 134 are formed from the same material and are connected to the body 110 at some point, but are configured to allow relative movement of the elongated spine 130. The connection may be below the cross-sectioned plane shown in FIG. 1. Generally, the elongated spine 130, the first ribs 132, and the second ribs 134 may be considered the moving portions of the actuator 114.

The first ribs 132 and the second ribs 134 are configured to thermally expand (elongate) and contract (shrink) in response to temperature changes within the first ribs 132 and the second ribs 134. Electrical contacts (not shown) are adapted for connection to a source of electrical power to supply electrical current flowing through the first ribs 132 and the second ribs 134 to thermally expand the first ribs 132 and the second ribs 134.

The actuator 114 is adapted to be controlled by an electronic control unit (ECU) or other programmable device (not shown in FIG. 1) which supplies variable current to the first ribs 132 and the second ribs 134. As the first ribs 132 and the second ribs 134 expand due to sufficient current flow, the elongated spine 130 moves, slides, or stretches downward (as viewed in FIG. 1), causing the beam 112 to rotate in the generally counter-clockwise direction. The resulting movement of the beam 112 causes the moveable end 128 to move upward (as viewed in FIG. 1) and progressively block more of the inlet port 116.

Closing the inlet port 116 allows less (and eventually no) fluid to flow into the first chamber 122, decreasing the pressure therein as the fluid drains to the outlet port 118. Once the inlet port 116 is closed, the MEMS microvalve 100 is in the second position (not shown), and no pilot signal is being communicated through the pilot port 120.

As the flow of current drops, the first ribs 132 and the second ribs 134 contract and the elongated spine 130 moves upward (as viewed in FIG. 1), causing the beam 112 to rotate in the generally clockwise direction. The resulting movement of the beam 112 causes the moveable end 128 to move downward (as viewed in FIG. 1) and progressively open more of the inlet port 116.

Opening the inlet port 116 allows more fluid to flow into the first chamber 122, increasing the pressure therein as the fluid flow overcomes the ability of the outlet port 118 to drain fluid from the first chamber 122. Once the inlet port 116 is substantially open, the MEMS microvalve 100 is in the first position (shown in FIG. 1), and a relatively strong pilot signal is being communicated through the pilot port 120.

In addition to the heat-actuated MEMS device shown in FIG. 1, other types of MEMS or MEMS-based actuators may be used in place of the MEMS microvalve 100 or in place of the actuator 114. In general, the micro-electrical-mechanical system (MEMS) based device may include any device that has one or more electronic elements fabricated through an integrated circuit technique (e.g., etching on a silicon wafer) and one or more mechanical elements fabricated through a micromachining process (e.g., forming structures and moving parts with dimensions in the micrometer range). The electronic and mechanical elements may also be formed by other processes. In alternative or additional approaches, configurations, or embodiments, the MEMS-based device may include other elements with dimensions in the micrometer range, such as an electromagnetic field actuator, a piezoelectric amplifier, a thermal actuator, a pressure sensor, a gyroscope, an optical switch, other MEMS-based devices, or any combination thereof.

Figure 2:
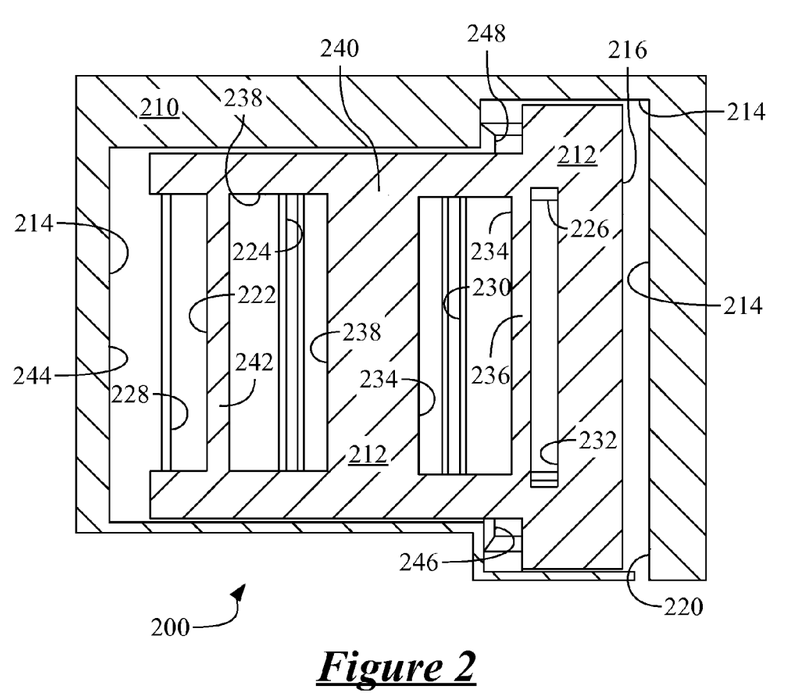
FIG. 2 is a schematic cross-sectional view of a MEMS spool valve which may be used alone or in conjunction with the MEMS microvalve actuator shown in FIG. 1.

Referring now to FIG. 2, and with continued reference to FIG. 1, there is shown a schematic cross-sectional view of a MEMS-based spool valve 200. The MEMS-based spool valve 200 includes a housing or body 210. The MEMS-based spool valve 200 may be formed from several layers of material, such as semi-conductor wafers. The body 210 may also be formed from multiple layers. For example, and without limitation, the cross-sectioned portions shown may be taken through a middle layer of the MEMS-based spool valve 200, with two other layers existing behind and in front of (relative to the view in FIG. 2) the middle layer.

The MEMS-based spool valve 200 includes a slider 212 configured to be movable to the left and to the right (as viewed in FIG. 2) within a cavity 214 defined by the body 210. The slider 212 is actuated by fluid pressure on a piloted surface 216, which is in fluid communication with a piloted chamber 220 of the cavity 214. Selective variation of pressure within the piloted chamber 220 alters the force applied to the piloted surface 216. The piloted chamber 220 may be in fluid communication with a pilot signal, such as the pilot signal produced by the pilot port 120 of the MEMS microvalve 100 shown in FIG. 1.

The slider 212 is formed with an elongated plate having a pair of oppositely disposed arms extending perpendicularly at a first end of the body so that the slider 212 is generally a T-shape, having the piloted surface 216 at a wider longitudinal end of the slider 212, and a counter surface 222 at a relatively-narrower opposing longitudinal end of the slider 212. The cavity 214 is also generally a T-shape.

The body 210 defines a number of ports connecting with the cavity 214, some of which may be formed in the cross-sectioned layer and some of which may be formed in other layers. The ports include a supply port 224, which is adapted to be connected to a source of high pressure fluid, such as a transmission pump (not shown). The supply port 224 may be connected to the same source of high-pressure fluid as the inlet port 116 of the MEMS microvalve 100 shown in FIG. 1. The body 210 also defines a tank port 226, which is connected to a low-pressure reservoir or fluid return (not shown). The tank port 226 may be connected to the same source of low-pressure fluid as the outlet port 118 of the MEMS microvalve 100 shown in FIG. 1.

A first load port 228 and a second load port 230 are formed in the body and communicate with the cavity 214. The first load port 228 and the second load port 230 are disposed on opposite sides of the supply port 224. The first load port 228 and the second load port 230 are adapted to be connected together to supply pressurized fluid to a hydraulically-operated component of the transmission or powertrain, as described herein. Additional ports, channels, or troughs (not viewable in FIG. 2) may be formed on the upper surface of the cavity 214 opposite the first load port 228 and the tank port 226. The additional troughs help balance flow forces acting on the slider 212.

The slider 212 shown includes three openings therethrough. A first opening 232, close to the piloted surface 216, is defined through the slider 212 to permit the fluid volume to equalize through the trough above the tank port 226 with the pressure at the tank port 226, balancing forces acting vertically (into and out of the view shown in FIG. 2) on the slider 212. A second opening 234 through the slider 212 forms an internal volume that is always in communication with the second load port 230.

A web 236 between the second opening 234 and the first opening 232 permits or prevents flow between the second load port 230 and the tank port 226 depending upon the position of the slider 212. In the illustrated position, the web 236 prevents flow between the second load port 230 and the tank port 226. When the web 236 moves to the right (as viewed in FIG. 2), a fluid pathway between the second load port 230 and the tank port 226 is opened, venting any pressure present at the second load port 230 to the low pressure reservoir connected to the tank port 226.

A third opening 238 through the slider 212 permits the fluid volume in the trough above the first load port 228 to equalize with the pressure at the first load port 228, which balances forces acting vertically (into and out of the view shown in FIG. 2) on the slider 212. A web 240 between the second opening 234 and the third opening 238 prevents flow between the supply port 224 and the second load port 230 in all positions of the slider 212.

A web 242 between the third opening 238 and the counter surface 222 permits or prevents flow between the supply port 224 and the first load port 228, depending upon the position of the slider 212. In the illustrated position, the web 242 prevents flow between the supply port 224 and the first load port 228. When the slider 212 moves to the left (as viewed in FIG. 2), a fluid pathway opens between the supply port 224 and the first load port 228, supplying pressurized fluid to the load connected to the first load port 228.

The slider 212 cooperates with the walls of the cavity 214 to define the piloted chamber 220 between the piloted surface 222 and the opposing wall of the cavity 214. A counter chamber 244 is defined between the counter surface 222 and the opposing wall of the cavity 214. The counter chamber 244 is in fluid communication with the first load port 228 at all times. Additionally, two volumes 246 and 248 may be defined between respective pairs of shoulders of the T-shaped plate forming the slider 212 and the shoulders of the T-shaped cavity 214. The volumes 246 and 248 are in communication with the tank port 226 at all times. In this manner, a hydraulic lock of the slider 212 is prevented.

The total area of the piloted surface 216 of the slider 212 is larger than the total area of the counter surface 222 of the slider 212. Therefore, when the pressures in the piloted chamber 220 and the counter chamber 244 are equal, the resultant unbalanced net force acting on the slider 212 will urge the slider 212 to the left (as viewed in FIG. 2).

The exact configuration of the ports and openings shown in the MEMS-based spool valve 200 and the slider 212 is not required. The MEMS-based spool valve 200 is configured to receive a relatively-small pilot signal, such as the pilot signal from the MEMS microvalve 100, and output a stronger signal (either for control or further piloting) to the load. When referring to fluidic signals, such as the pilot signal received by the MEMS-based spool valve 200, the term small may generally refer to relatively low flow volumetric flow. Therefore, the MEMS-based spool valve 200 amplifies the pilot signal and allows the pilot signal to control or pilot devices requiring higher flow or higher pressure than provided by the pilot signal alone.

Figure 3:
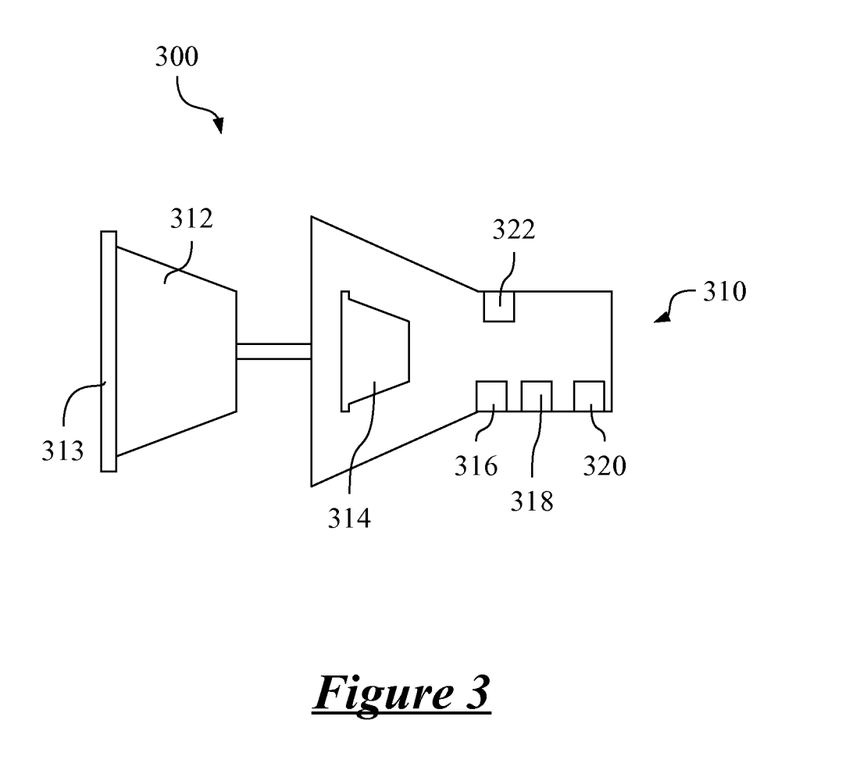
FIG. 3 is a schematic diagram of a powertrain having a transmission that includes a torque converter, into which one or more pressure/flow control systems may be incorporated.

Referring now to FIG. 3, and with continued reference to FIGS. 1-2, there is shown a schematic diagram of a powertrain 300 having an automatic transmission 310 with a torque converter 312. A pressure/flow control system may be incorporated into the transmission 310, the torque converter 312, or other components or systems of the powertrain 300.

To transfer torque from an engine (not shown) to the transmission 310 and eventually to the vehicle wheels (not shown), the torque converter 312 provides a fluid coupling between an engine output member (not shown) and the input (not separately identified) to the rest of transmission 310 and is generally coaxially aligned with each. Note that while the torque converter 312 is shown schematically as detached from the rest of the transmission 310, the torque converter 312 may be incorporated directly into the transmission 310. The torque converter 312 may include a torque converter clutch 313, which selectively locks the engine output to the input to the rest of transmission, such that the two rotate together. The torque converter clutch 313 selectively provides a mechanical coupling between the engine and the rest of the transmission 310.

The torque converter 312 allows power and torque to be transferred between the engine and the transmission 310 without stalling the engine, even while the output of the transmission 310 is not rotating or is rotating in reverse. The torque converter 312 allows the engine output to rotate even though the output of the torque converter to the transmission 310 is not rotating. Additionally, when the powertrain 300 is a hybrid powertrain, the torque converter clutch 313 may be used to facilitate the transfer of rotational energy from the transmission 310 to the engine in order to start the engine.

Through selective, and variable (or slipping), actuation of one or more shift clutch assemblies 314 within the transmission 310, different operating states of the transmission 310 may be selected. For example, and without limitation, multiple clutches or brakes used to select and change the speed ratio of the transmission 310 may be actuated by one or more of the shift clutch assemblies 314 (only one of which is illustrated in FIG. 3). The transmission 310 includes a lube regulating valve 316 configured to control the flow hydraulic fluid for lubrication of the transmission 310. The lube regulating valve 316 may also control the flow of hydraulic fluid for cooling of the transmission 310.

An on/off valve 318 may be used to control components of the transmission 310 which are hydraulically-driven between substantially-on or substantially-off states (i.e. components that do not utilize regulated pressure amounts between fully on and fully off). The on/off valve 318 may provide similar functionality to an on/off solenoid. However, the on/off valve 318 may be actuated by the MEMS microvalve 100 (or an amplified signal therefrom) instead of the induction coil of a solenoid. The on/off valve 318, or a plurality thereof, may be disposed intermediate other hydraulically-actuated components.

A line pressure control valve 320 is configured to control the base pressure of hydraulic fluid in the transmission 310. The line pressure control valve 320 provides consistently-pressurized fluid from the pump to many components of the transmission 310.

A controller 322 may control actuation of the components of the powertrain 300, including selection of the speed ratio of the transmission 310. The controller 322 may include multiple devices and may include distributed controller architecture, such as the microprocessor-based electronic control unit (ECU). The controller 322 may include one or more components with a storage medium and a suitable amount of programmable memory, which are capable of storing and executing one or more algorithms or methods to effect control of the powertrain 300 or components thereof. Furthermore, the controller 322 may be configured to provide the electric current which selectively and variably actuates the MEMS microvalve 100 shown in FIG. 1.

Referring now to FIGS. 4-7, and with continued reference to FIGS. 1-3, there are shown schematic box diagrams of options for pressure/flow control systems for hydraulic components within a transmission, such as the transmission 310 of the powertrain 300 shown in FIG. 3 or other powertrain configurations. Each of the plurality of options for pressure/flow control systems shown and described may be used for operation and control of any of the plurality of components shown and described. Furthermore, additional pressure/flow control system options may be created by combining the various MEMS devices discussed with other MEMS devices and with metal valves, regulating valves, or spool valves.

Figure 4:
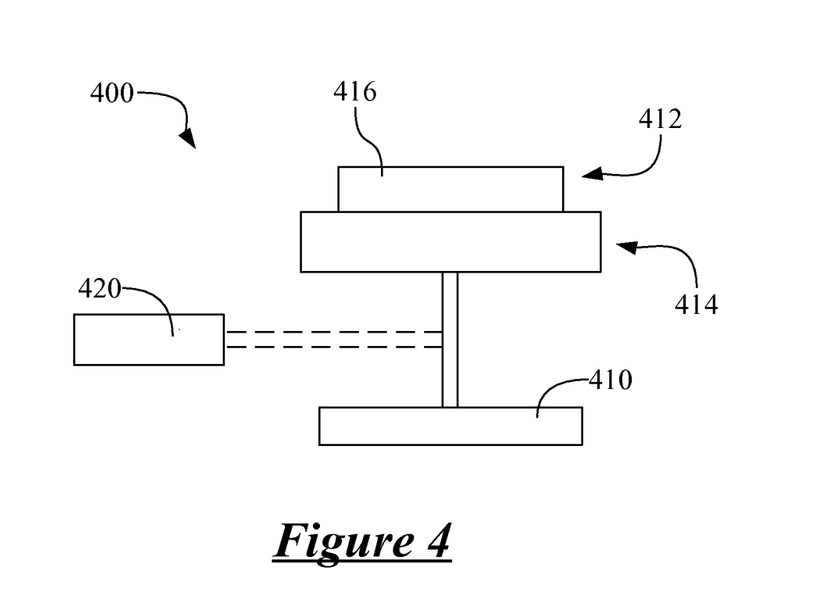
FIG. 4 is a schematic box diagram of a first option for a pressure/flow control system for a hydraulically-controlled component within the powertrain.

FIG. 4 shows a first option 400 for a pressure/flow control system for a hydraulically-actuated component 410 within the transmission 300. The first option 400 includes a pilot valve 412 controlling a regulating valve 414. The regulating valve 414 is in fluid communication with the pilot valve 412. The pilot valve 412 includes a first valve 416 producing a pilot signal. The regulating valve 414 is configured to receive the pilot signal and the regulating valve 414 is configured to output a control signal which controls the hydraulically-actuated component 410.

The hydraulically-controlled component 410 may be any one of the components of the powertrain 300 shown in FIG. 3. For example, and without limitation, the hydraulically-controlled component 410 may be one of: the shift clutch assembly 314, the lubrication loop (controlled by the lube regulating valve 316), the on/off states (controlled by the on/off valve 318), the line pressure (controlled by the line pressure control valve 320), the torque converter clutch 313, or relevant pressure/flow states in other applications. In some embodiments of the powertrain 300, the hydraulically-controlled component 410 may actually be two or more of these components, and some hydraulically-controlled components 410 may use multiple pressure/flow control systems (including different options) for control over the component.

In the first option 400 shown in FIG. 4, the first valve 416 may include the MEMS microvalve 100 shown in FIG. 1, and the regulating valve 414 may include the MEMS-based spool valve 200. Therefore, as described herein, the MEMS microvalve 100 produces the pilot signal and communicates through the pilot port 120 to the piloted chamber 220 of the MEMS-based spool valve 200.

As shown in FIGS. 1 and 2, when the MEMS microvalve 100 is combined with the MEMS-based spool valve 200, either by attaching the two directly together or by fluidly connecting the pilot port 120 and the piloted chamber 220, the MEMS microvalve 100 acts on the MEMS-based spool valve 200 to alter the fluid flow and pressure to the first load port 228 and the second load port 230.

The inlet port 116 in the MEMS microvalve 100 is relatively small in comparison to the supply port 224 and the first load port 228 of the MEMS-based spool valve 200. In combined operation, the beam 112 of the MEMS microvalve 100 uncovers the inlet port 116, and fluid flows through the inlet port 116, the first chamber 122, and the outlet orifice 124 to the outlet port 118. The inlet port 116 may act as an additional orifice in this flow path.

Due to a possible pressure drop through the inlet port 116, it may not be possible to get the pressure in the piloted chamber 220 of the MEMS-based spool valve 200 up to the pressure provided by the high-pressure fluid source. The pressure in the counter chamber 244 may achieve a higher pressure (at or near pump outlet pressure) than may be achieved in the piloted chamber 220, owing to the larger openings of the supply port 224 and the first load port 228 of the MEMS-based spool valve 200, and resultant low pressure drop when fluid flows through these ports. However, because the surface area of the piloted surface 216 is greater than the surface area of the counter surface 222, the slider 212 can still be moved leftward (as viewed in FIG. 2) even if the pressure in the piloted chamber 220 acting on the piloted surface 216 is less than the pressure in the counter chamber 244.

The MEMS-based spool valve 200 has three principal zones or positions of operation: a pressure increase position, a pressure hold position, and a pressure decrease position. The MEMS-based spool valve 200 is shown in FIG. 2 in the pressure hold position, such that the MEMS-based spool valve 200 is holding pressurized fluid on the hydraulically-actuated component 410 (the load).

If the slider 212 is moved rightward (as viewed in FIG. 2), the MEMS-based spool valve 200 is in the pressure decrease position. This is accomplished when the controller 322 commands the MEMS microvalve 100 to close, by increasing electric current supplied to the actuator 114. The first and second ribs 132 and 134 of the actuator 114 expand, causing the beam 112 to pivot counter-clockwise (bending the flexure pivot 126) and cover more of the inlet port 116. Flow decreases through the first chamber 122 from the inlet port 116 to the outlet port 118. The pressure drop across the outlet orifice 124 decreases.

The MEMS microvalve 100 shown defaults to the open position, which may be referred to as a "normally high" or "normally on" valve. Alternatively, the MEMS microvalve 100 may be configured close by decreasing the electric current supplied to the actuator 114, such that the MEMS microvalve 100 would default to the closed position, which may be referred to as a "normally low" or "normally off" valve.

Pressure in the first chamber 122 and the pilot port 120 also decreases. Because the pilot port 120 is in direct fluid communication with the piloted chamber 220, this results in an imbalance of the forces acting on the slider 212. The decreased force acting on the piloted surface 216 (due to the lowered pressure in the piloted chamber 220) is now less than the unchanged force acting on the counter surface 222 due to the pressure in the counter chamber 244 (connected to the load).

The force imbalance urges the slider 212 of the MEMS-based spool valve 200 to the right (as viewed in FIG. 2). The web 236 is thus moved rightward, permitting flow of pressurized fluid from the hydraulically-controlled component 410, through the second load port 230 and through the second opening 234 in the slider 212. From there, some of the flow passes directly out of the tank port 226, while some flow may pass up into the trough above the tank port 226, over the top of the web 236, down through the first opening 232 and out the tank port 226. In this manner, pressure is released from the hydraulically-controlled component 410 and vented to the low pressure reservoir connected to the tank port 226.

The slider 212 of the MEMS-based spool valve 200 will move back to the pressure hold position when the pressure in the counter chamber 244 (acting through the first load port 228) is decreased such that forces acting on the slider 212 urge the slider 212 leftward (as viewed in FIG. 2). With forces equalized, the slider 212 of the MEMS-based spool valve 200 will stop in the pressure hold position. Thus, the pressure at the load (as sensed through the first load port 228 and the second load port 230) will be proportionate to the electrical signal (current) supplied to the actuator 114.

To move the MEMS-based spool valve 200 into the pressure increase position, the controller 322 decreases current flow through the ribs of the actuator 114 and the beam 112 of the MEMS microvalve 100 pivots clockwise to uncover more of the inlet port 116. This results in a pressure increase in the piloted chamber 220, while the pressure in the counter chamber 244 remains constant. The slider 212 is moved leftward (as viewed in FIG. 2) due to the resultant imbalance of forces acting on the slider 212. If the MEMS-based spool valve 200 was in the pressure decrease position, the leftward movement moves the slider valve back to the pressure hold position shown in FIG. 2.

If the controller 322 further decreases current flow and causes the MEMS microvalve 100 to open further, the pressure in the piloted chamber 220 further increases, urging the slider 212 of the MEMS-based spool valve 200 further leftward (as viewed in FIG. 2) into the pressure increase position. The web 242 is moved leftward, permitting flow of pressurized fluid from the supply port 224 through the third opening 238 in the slider 212. From the third opening 238, some of the flow passes directly out of the first load port 228, while some flow may pass up into the trough over the top of the web 242, through the second counter chamber 244 and out of the first load port 228. In this manner, pressure is directed from the source of high-pressure fluid connected to the supply port 224 and applied to the load connected to the first load port 228 (e.g., the hydraulically-operated component 410).

The control signal produced by the MEMS-base spool valve 200 may have sufficient pressure and flow characteristics to control the hydraulically-controlled component 410 with a relatively-short response time. Alternatively, the pilot signal produced by the MEMS microvalve 100 may be able to directly control the hydraulically-controlled component 410 without amplification. However, the response times from directly controlling the hydraulically-controlled component 410 with the MEMS microvalve 100 may be relatively slower than when combined with the MEMS-based spool valve 200 or another amplifying valve (through increases in flow).

As also shown in FIG. 4, the first option 400 further includes a MEMS pressure transducer 420. The MEMS pressure transducer 420 is optional. However, when used, the MEMS pressure transducer 420 is configured to sense the pressure profile of the control signal from the regulating valve 414. The controller 322, or other control device, may be configured to receive input from the MEMS pressure transducer 420 and to provide output to the MEMS microvalve 100 in the pilot valve 412 to regulate the system pressure in response to input from the MEMS pressure transducer 420. Therefore, with the MEMS pressure transducer 420 and the controller 322, the first option 400 may be configured for closed-loop feedback and adjustment of the control signal sent to the hydraulically-controlled component 410.

Figure 5:
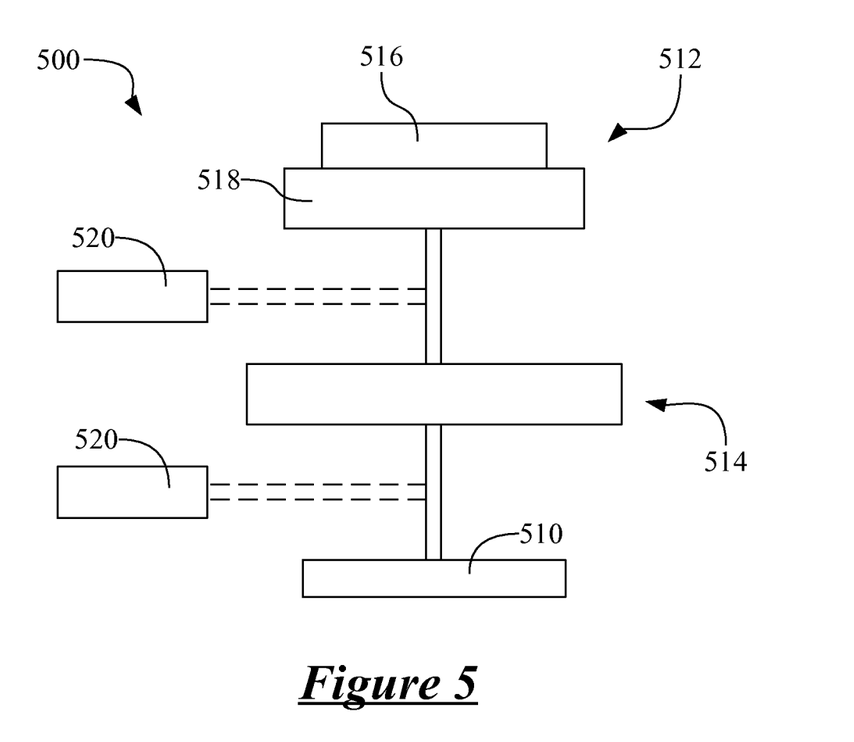
FIG. 5 is a schematic box diagram of a second option for a pressure/flow control system for the hydraulically-controlled component within the powertrain.

FIG. 5 shows a second option 500 for a pressure/flow control system for a hydraulically-actuated component 510 within the transmission 300. The second option 500 includes a pilot valve 512 controlling a regulating valve 514. The regulating valve 514 is in fluid communication with the pilot valve 512.

The pilot valve 512 includes a first valve 516 producing a pilot signal. However, unlike the first option 400 shown in FIG. 4, in the second option 500 the pilot valve 512 also includes a second valve 518, which steps up or amplifies the pilot signal to an amplified pilot signal. The regulating valve 514 is configured to receive the amplified pilot signal and the regulating valve 514 is configured to output a control signal, which controls the hydraulically-actuated component 510.

In the second option 500 shown in FIG. 5, the first valve 516 may include the MEMS microvalve 100 shown in FIG. 1 and the second valve 518 may include the MEMS-based spool valve 200. Therefore, as already described herein, the MEMS microvalve 100 selectively produces the pilot signal and communicates through the pilot port 120 to the piloted chamber 220 of the MEMS-based spool valve 200. However, with the second option 500, the output of the MEMS-based spool valve 200 is the amplified pilot signal, which is then used by the regulating valve 514.

In the second option 500 shown in FIG. 5, the regulating valve 514 is a conventional mechanical regulating valve. Generally, the conventional mechanical regulating valve is a regulating valve produced by mechanical machining processes, as opposed to the micromachining processes used to produce MEMS-based devices. Based upon the amplified pilot signal provided by the pilot valve 512, the conventional mechanical regulating valve provides the control signal for the hydraulically-actuated component 510.

The amplified pilot signal produced by the pilot valve 512 (including both the first valve 516 and the second valve 518) may have sufficient pressure and flow characteristics to control the conventional mechanical regulating valve, which may then control the hydraulically-controlled component 510. However, the pilot signal produced by the first valve 516 (the MEMS microvalve 100) of the pilot valve 512 would may not be able to directly pilot the conventional mechanical regulating valve without delaying the response time. While the MEMS microvalve 100 may be able to directly control the hydraulically-controlled component 510, the response time may be limited due to the limited flow passing through the MEMS microvalve 100. The conventional mechanical regulating valve further increases the pressure and flow characteristics used to control the hydraulically-controlled component 510, as compared to the first option 400 shown in FIG. 4.

Similar to the first option shown in FIG. 4, the second option 500 may further include one or more optional MEMS pressure transducers 520. However, when used, the MEMS pressure transducers 520 are configured to sense the pressure profile of the amplified pilot signal from the pilot valve 512 or of the control signal from the regulating valve 514. In most configurations, only one of the MEMS pressure transducers 520 will be used. If used to sense the pressure profile of the pilot signal, the MEMS pressure transducer 520 may be packaged into a single package along with the MEMS microvalve 100 and the MEMS-based spool valve 200 for the pilot valve 512.

The controller 322, or other control device, is configured to receive input from one or more of the MEMS pressure transducers 520 and to provide output to the MEMS microvalve 100 in the pilot valve 512 to regulate the system pressure in response to input from one of the MEMS pressure transducers 520. Therefore, the MEMS pressure transducers 520 provide closed-loop feedback and adjustment of the control signal sent to the hydraulically-controlled component 510.

The hydraulically-controlled component 510 may be any one of the components of the powertrain 300 shown in FIG. 3. For example, and without limitation, the hydraulically-controlled component 510 may be one of: the shift clutch assembly 314, the lubrication loop (controlled by the lube regulating valve 316), the on/off states (controlled by the on/off valve 318), the line pressure (controlled by the line pressure control valve 320), and the torque converter clutch 313. In some embodiments of the powertrain 300, the hydraulically-controlled component 510 may actually be two or more of these components. Each of the first option 400 and the second option 500 may be used with any of the components of the powertrain 300.

Figure 6:
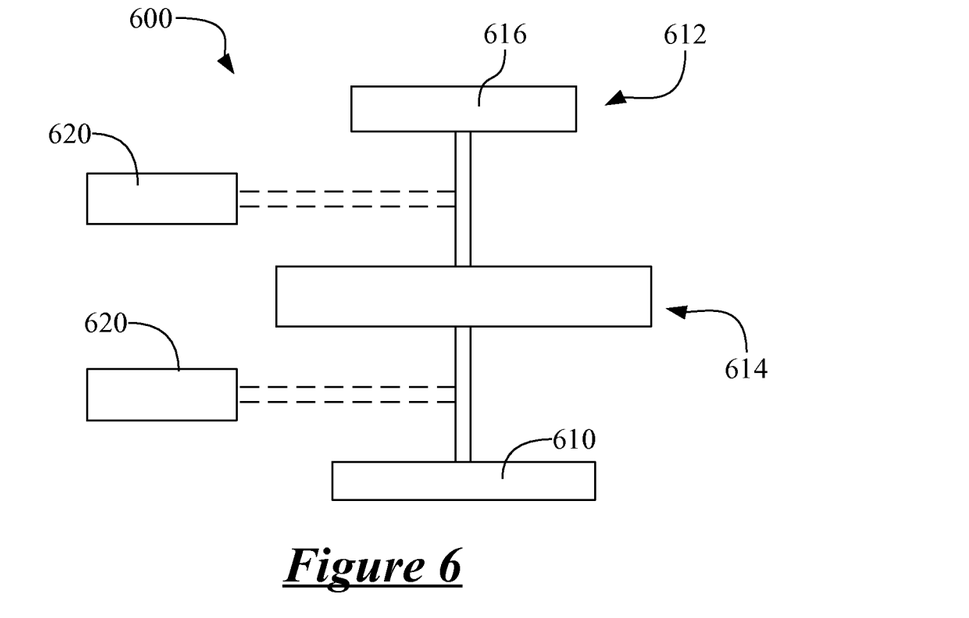
FIG. 6 is a schematic box diagram of a third option for a pressure/flow control system for the hydraulically-controlled component within the powertrain.

FIG. 6 shows a third option 600 for a pressure/flow control system for a hydraulically-actuated component 610 within the transmission 300. The third option 600 includes a pilot valve 612 controlling a regulating valve 614. The regulating valve 614 is in fluid communication with the pilot valve 612.

The pilot valve 612 includes a first valve 616 producing a pilot signal. The regulating valve 614 is configured to receive the pilot signal and the regulating valve 614 is configured to output a control signal, which controls the hydraulically-actuated component 610.

In the third option 600 shown in FIG. 6, the first valve 616 may include the MEMS microvalve 100 shown in FIG. 1, but there is no additional valve forming the pilot valve 612. Therefore, unlike the first option 400 shown in FIG. 4 and in the second option 500 shown in FIG. 5, the MEMS microvalve 100 communicates the pilot signal directly to the regulating valve 614, which is a small mechanical spool valve.

Generally, the small mechanical spool valve is a regulating valve produced by mechanical machining processes, but on a smaller scale than the conventional mechanical regulating valve. Based upon the (un-amplified) pilot signal provided by the pilot valve 612, the small mechanical spool valve provides the control signal for the hydraulically-actuated component 610. Compared to the conventional mechanical regulating valve used in the second option 500 shown in FIG. 5, the small mechanical spool valve is, for example, on the order half of the size of the conventional mechanical regulating valve.

The pilot signal produced by the pilot valve 612 (including only the MEMS microvalve 100) may have sufficient pressure and flow characteristics to control the small mechanical spool valve used for the regulating valve 614 with relatively quick response times. While the MEMS microvalve 100 alone may be capable of directly controlling the conventional mechanical regulating valve used in the second option 500, the response times for actuation may be delayed. The small mechanical spool valve used for the regulating valve 614 in the third option 600 may be used to amplify the signal from the MEMS microvalve 100, such that the small mechanical spool valve may control the hydraulically-controlled component 610.

The third option 600 may further include one or more optional MEMS pressure transducers 620. The MEMS pressure transducers 620 are again optional. However, when used, the MEMS pressure transducers 620 are configured to sense the pressure profile of the pilot signal from the pilot valve 612 or of the control signal from the regulating valve 614. In most configurations, only one of the MEMS pressure transducers 620 will be used. If used to sense the pressure profile of the pilot signal, the MEMS pressure transducer 620 may be packaged into a single package along with the MEMS microvalve 100 for the pilot valve 612.

The controller 322, or another controller, is configured to receive input from one or more of the MEMS pressure transducers 620 and to provide output to the MEMS microvalve 100 in the pilot valve 612 to regulate the system pressure in response to input from one of the MEMS pressure transducers 620. Therefore, the MEMS pressure transducers 620 provide closed-loop feedback and adjustment of the control signal sent to the hydraulically-controlled component 610.

The hydraulically-controlled component 610 may be any one of the components of the powertrain 300 shown in FIG. 3. For example, and without limitation, the hydraulically-controlled component 610 may be one of: the shift clutch assembly 314, the lubrication loop (controlled by the lube regulating valve 316), the on/off states (controlled by the on/off valve 318), the line pressure (controlled by the line pressure control valve 320), and the torque converter clutch 313. In some embodiments of the powertrain 300, the hydraulically-controlled component 610 may actually be two or more of these components. Each of the first option 400, the second option 500, and the third option 600 may be used with any of the components of the powertrain 300.

Figure 7:
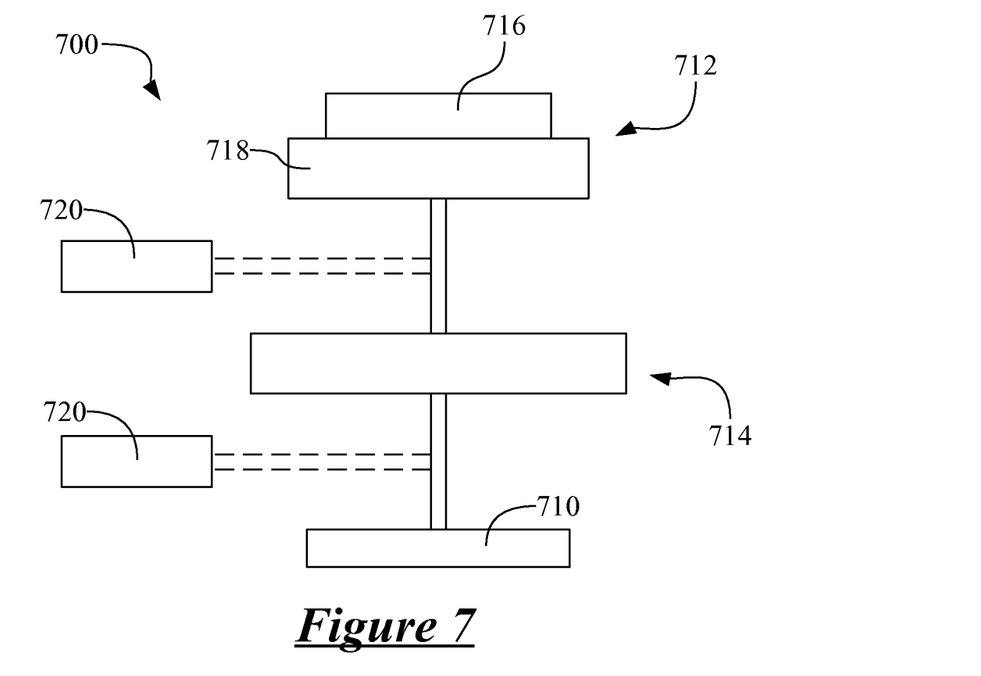
FIG. 7 is a schematic box diagram of a fourth option for a pressure/flow control system for the hydraulically-controlled component within the powertrain.

FIG. 7 shows a fourth option 700 for a pressure/flow control system for a hydraulically-actuated component 710 within the transmission 300. The fourth option 700 includes a pilot valve 712 controlling a regulating valve 714. The regulating valve 714 is in fluid communication with the pilot valve 712.

The pilot valve 712 includes a first valve 716 producing a pilot signal. Similar to the second option 500 shown in FIG. 5, the pilot valve 712 also includes a second valve 718, which steps up, or amplifies, the pilot signal to an amplified pilot signal. The regulating valve 714 is again configured to receive the amplified pilot signal and the regulating valve 714 is configured to output a control signal, which controls the hydraulically-actuated component 710.

In the fourth option 700 shown in FIG. 7, the first valve 716 may include the MEMS microvalve 100 shown in FIG. 1. However, the second valve 718 is a small mechanical spool valve. The regulating valve 714 is again a conventional mechanical regulating valve. Based upon the amplified pilot signal provided by the pilot valve 712, the conventional mechanical regulating valve provides the control signal for the hydraulically-actuated component 710.

Therefore, as already described herein, the MEMS microvalve 100 selectively produces the pilot signal and communicates through the pilot port 120 to the small mechanical spool valve. However, with the fourth option 700, the output of the small mechanical spool valve is the amplified pilot signal, which is then used by the regulating valve 714. In the fourth option 700, the small mechanical spool valve used as the second valve 718 functions similarly to the MEMS-based spool valve 200 used as the second valve 518 in the second option 500 shown in FIG. 5. However, the small mechanical spool valve used as the second valve 718 for the fourth option 700 may be at least one-hundred times larger than the MEMS-based spool valve 200 used for the second valve 518 in the second option 500.

The amplified pilot signal produced by the pilot valve 712 (including both the first valve 716 and the second valve 718) has sufficient pressure and flow characteristics to control the conventional mechanical regulating valve, which may then control the hydraulically-controlled component 710. The pilot signal produced by the first valve 716 alone (the MEMS microvalve 100) may not be able to directly pilot the conventional mechanical regulating valve or may not be able to directly control the hydraulically-controlled component 710 without causing a delayed response due to the low-volume flow from the MEMS microvalve 100. The conventional mechanical regulating valve further increases the pressure and flow characteristics used to control the hydraulically-controlled component 710.

The fourth option 700 may further include one or more optional MEMS pressure transducers 720. However, when used, the MEMS pressure transducers 720 are configured to sense the pressure profile of the amplified pilot signal from the pilot valve 712 or of the control signal from the regulating valve 714. In most configurations, only one of the MEMS pressure transducers 720 will be used.

The controller 322, or other controller, is configured to receive input from one or more of the MEMS pressure transducers 720 and to provide output to the MEMS microvalve 100 in the pilot valve 712 to regulate the system pressure in response to input from one of the MEMS pressure transducers 720. Therefore, the MEMS pressure transducers 720 provide closed-loop feedback and adjustment of the control signal sent to the hydraulically-controlled component 710.

The hydraulically-controlled component 710 may be any one of the components of the powertrain 300 shown in FIG. 3. For example, and without limitation, the hydraulically-controlled component 710 may be one of: the shift clutch assembly 314, the lubrication loop (controlled by the lube regulating valve 316), the on/off states (controlled by the on/off valve 318), the line pressure (controlled by the line pressure control valve 320), and the torque converter clutch 313. In some embodiments of the powertrain 300, the hydraulically-controlled component 710 may actually be two or more of these components. Each of the first option 400, the second option 500, the third option 600, and the fourth option 700 may be used with any of the components of the powertrain 300.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A pressure and flow control system for an automatic transmission, the pressure and flow control system comprising:
 a hydraulically-controlled component disposed within the automatic transmission;
 a MEMS Micro Electro Mechanical Systems) pilot microvalve configured to output an unamplified pilot signal; and
 a mechanical regulating valve in fluid communication with the MEMS pilot microvalve, wherein the mechanical regulating valve is configured to receive the unamplified pilot signal and is configured to output an amplified control signal which controls the hydraulically-controlled component.

2. The pressure and flow control system of claim 1, further comprising a MEMS pressure transducer, wherein the MEMS pressure transducer is configured to sense the pressure profile of one of the unamplified pilot signal and the amplified control signal.

3. The pressure and flow control system of claim 2, further comprising a controller; wherein the controller is configured to receive input from the MEMS pressure transducer and to provide output to the MEMS pilot microvalve to regulate the system pressure in response to input from the MEMS pressure transducer.

4. The pressure and flow control system of claim 3, wherein the controller is configured to provide an electronic current, wherein the MEMS pilot microvalve is configured to produce the unamplified pilot signal in response to the electronic current.

5. The pressure and flow control system of claim 4, wherein the hydraulically-controlled component is a torque converter clutch, and wherein the amplified control signal from the mechanical regulating valve is configured to variably control engagement of the torque converter clutch.

6. The pressure and flow control system of claim 4, wherein the hydraulically-controlled component is one of a clutch assembly, a lubrication loop, an on/off state, a line pressure, and a torque converter clutch.

7. The pressure and flow control system of claim 1, further comprising a controller; wherein the controller is configured to receive input from the MEMS pressure transducer and to provide output to the MEMS pilot microvalve to regulate the system pressure in response to input from the MEMS pressure transducer.

8. The pressure and flow control system of claim 7, wherein the controller is configured to provide an electronic current, wherein the MEMS pilot microvalve is configured to produce the unamplified pilot signal in response to the electronic current.

* * * * *